Inventor
J. E. Kennedy.

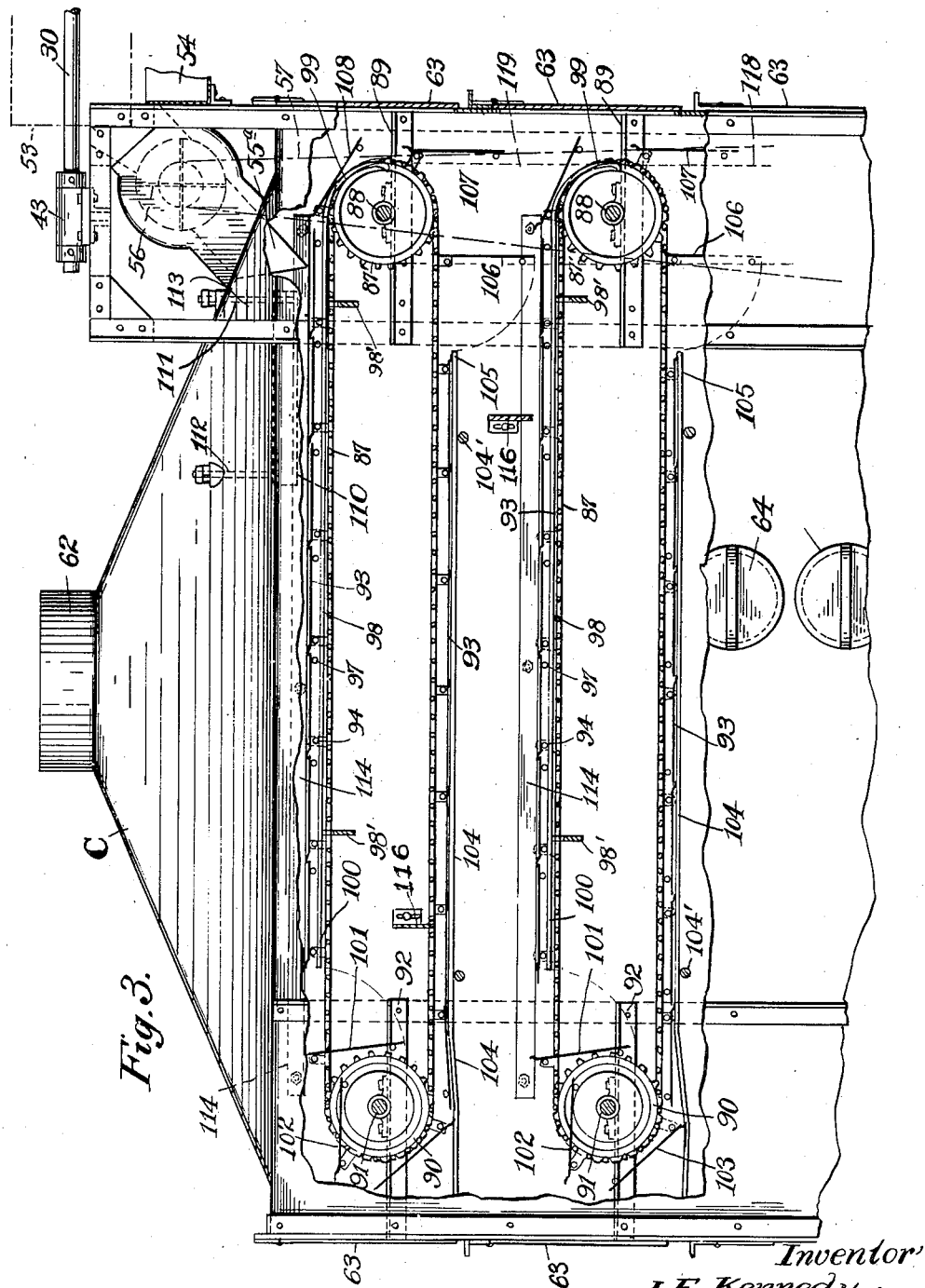

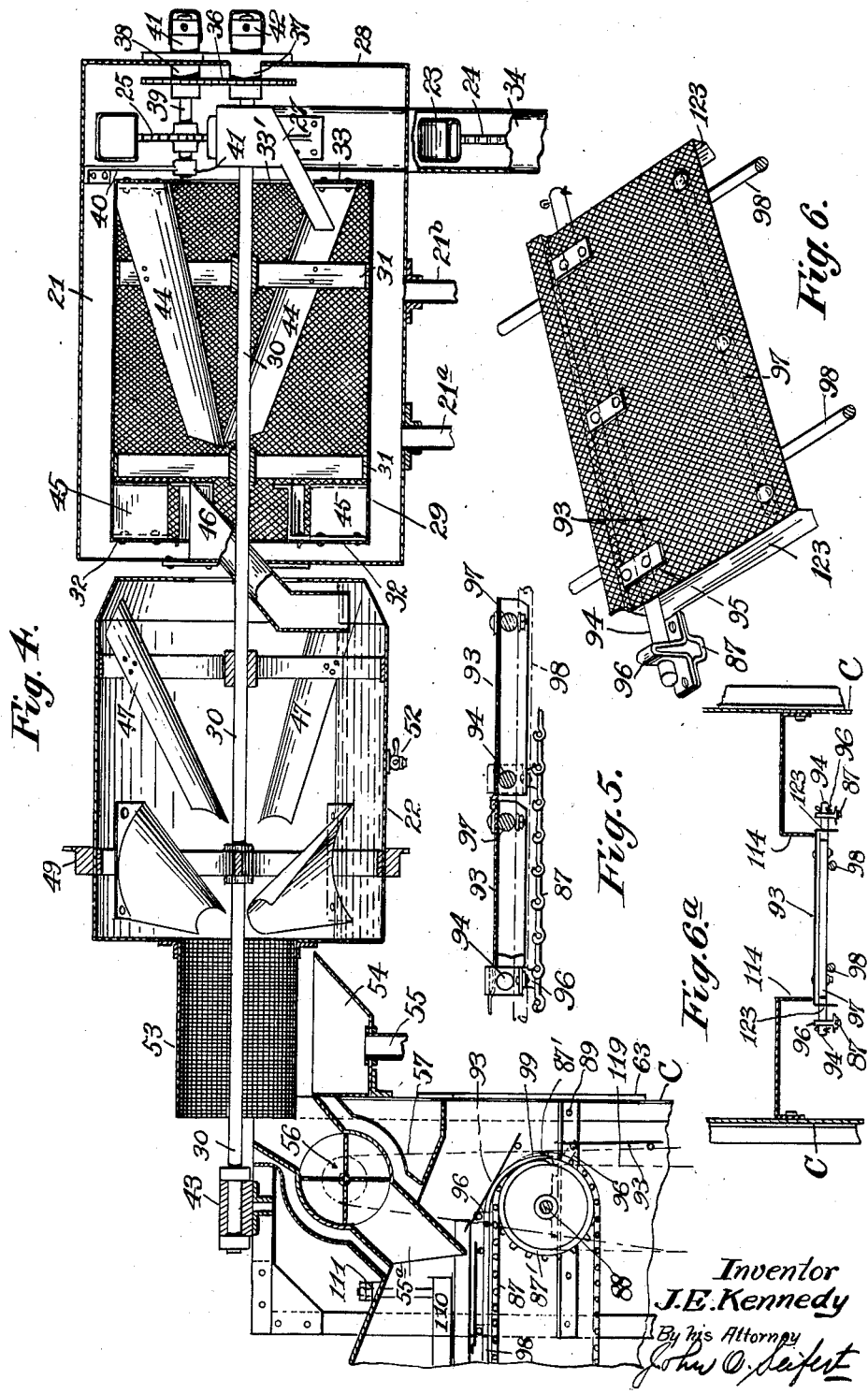

Jan. 30, 1923.
J. E. KENNEDY.
APPARATUS FOR DEHYDRATING FRUIT, VEGETABLES, AND OTHER MATERIALS.
FILED FEB. 18, 1919.
1,443,367
4 SHEETS-SHEET 4
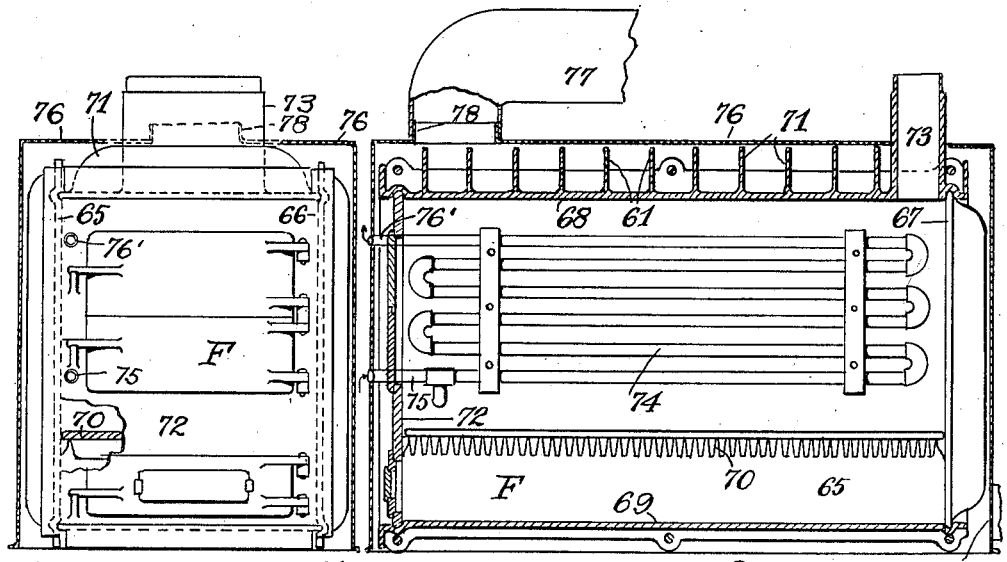
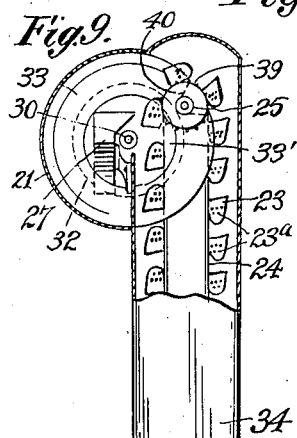
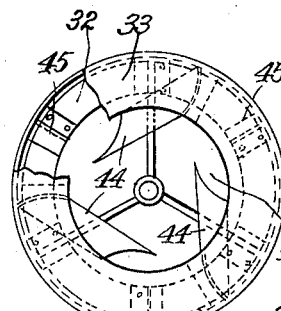
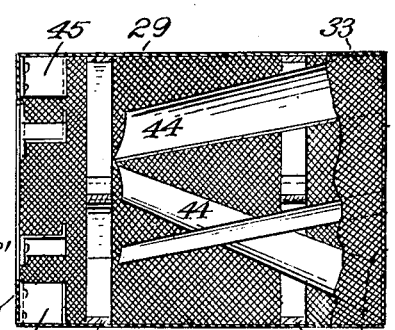
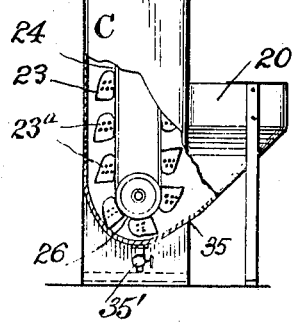
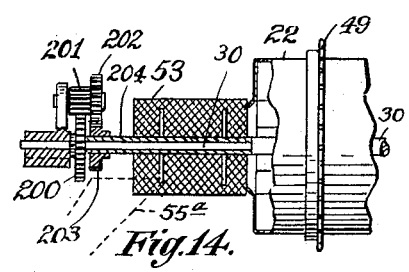
Inventor
J. E. Kennedy
By his Attorney

Patented Jan. 30, 1923.

1,443,367

UNITED STATES PATENT OFFICE.

JOSEPH E. KENNEDY, OF NEW YORK, N. Y.

APPARATUS FOR DEHYDRATING FRUIT, VEGETABLES, AND OTHER MATERIALS.

Application filed February 18, 1919. Serial No. 277,731.

*To all whom it may concern:*

Be it known that I, JOSEPH E. KENNEDY, a citizen of the United States, and a resident of the borough of Manhattan in the city, county, and State of New York, have invented new and useful Improvements in Apparatus for Dehydrating Fruit, Vegetables, and Other Materials, of which the following is a specification.
This invention relates to dehydrating of material, such as fruit, vegetables and other material, and it is the primary object of the invention to provide apparatus for treating material, such as fruit, vegetables and the like, in such a manner that there will be no breaking of the cellular structure and they may be restored to their original condition by the addition of water, and to provide apparatus for carrying out the same is simple cheap and compact in structure and efficient in operation.

In carrying out the invention the fruit or vegetables are first pared and cleaned and preferably cut into parts, after which they are partially cooked by subjection to direct contact with steam, and then dried by subjecting the same to dried and preheated air. In some materials in which the cellular structure is very delicate in order to prevent any breaking down of the cellular structure the materials after being steamed and previous to being subjected to the heated air are subjected to a chilling bath, as by submerging the same quickly in water, as they are delivered from the steaming means and previous to subjecting the material to treatment by the heated air.

It is another object of the invention to provide apparatus in which the carrying out of the above process is continuous; that is, the travel or feeding of the material from the entrance of the material in its untreated state is progressive through the apparatus to its delivery in treated condition from the drying means.

In the dehydrating of certain fruits, such as apples and peaches, and vegetables, such as potatoes, great difficulty has been experienced in retaining the same in their original condition as to color, due to the action of the acids of the fruit and vegetables while in contact with the air with the result that they become discolored making the same unpleasant to the sight and unappetizing. It has been found, however, that such discoloring of the fruit and vegetables does not take place after the same have been cooked or partially cooked by subjecting the same to direct contact with steam, said cooking tending to neutralize the acid, in the form of a starchy acid, at the outer surfaces of the parts of the fruit or vegetables. It is a further object of the invention to provide an apparatus in which the process is continuous from the delivery of the material to the apparatus to the discharge therefrom, and in which the fruit or vegetables, after being pared and cleaned, are placed in a receptacle and submerged in water therein, are delivered from such receptacle to a steaming means without contact with the air and therefore without any possibility of discoloring.

In the dehydrating of material it is essential that during the drying process there be no appreciable diminution in the temperature of the air with a consequent reduction in the capacity of the air to take up moisture, and it is a further object of the invention to provide improved means to heat and provide a constant supply or current of heated air in a chamber through which the material being dried is transported.

It is a further object of the invention to provide an improved heating means or furnace to heat the air and in which the steam to cook the fruit or vegetables is generated simultaneously with the heating of the air for the drying of the same.

It is a further object of the invention to provide an improved drying chamber and conveyor means to transport the material to and fro in the chamber, and the chamber arranged whereby access may be had for inspection of the material being dried during any stage of the drying process.

In the drawings accompanying and forming a part of this specification, Figure 1 is a plan view illustrating an embodiment of apparatus for carrying out my improved process of dehydrating material.

Figure 3 is an enlarged sectional front elevation of the upper portion of the drying chamber and the means to move or transport the material to and fro therein.

Figure 4 is an enlarged sectional side elevation of the steaming means, a portion of the means to deliver the material to the steaming means, the chilling means, and means to deliver the material from the steaming means to the chilling means and from the latter to means to drain the surplus water therefrom, and from the draining means to conveyor means in the drying chamber.

Figure 5 is an enlarged side elevation of a portion of the conveying or transporting means in the drier.

Figure 6 is an enlarged detail in perspective looking at the top of a material supporting means of the conveyor.

Figure 6a is a sectional end elevation of the conveyor means and showing the relation of guides thereto to prevent the spilling of the material from the lateral ends of the material supporting means or trays.

Figure 7 is a front elevation, partly in section, of a furnace for generating steam used to steam cook the material and to heat the air for the drying chamber.

Figure 8 is a sectional side elevation of the furnace shown in Figure 7.

Figure 9 is an enlarged sectional side elevation of conveyor means to transport the material from a receptacle for the material and convey and deliver the same to the steaming means.

Figure 10 is an end elevation of a revoluble carrier for the material during the steam cooking thereof.

Figure 11 is a view of the carrier looking at the side of Figure 10 and showing the means to progressively advance or feed the material through and deliver it from the carrier.

Figure 12 is a perspective view of means for spreading the material in a thin layer upon the conveyor in the drying chamber as the material is delivered thereto.

Figure 13 is a detail of one of the conveyor buckets for transporting the material from the receptacle to the steaming means; and Figure 14 is a sectional side elevation showing a modification of the means to drain the surplus water from the material as it is delivered from the chilling means.

Similar characters of reference designate like parts throughout the different views of the drawings.

Figure 1:
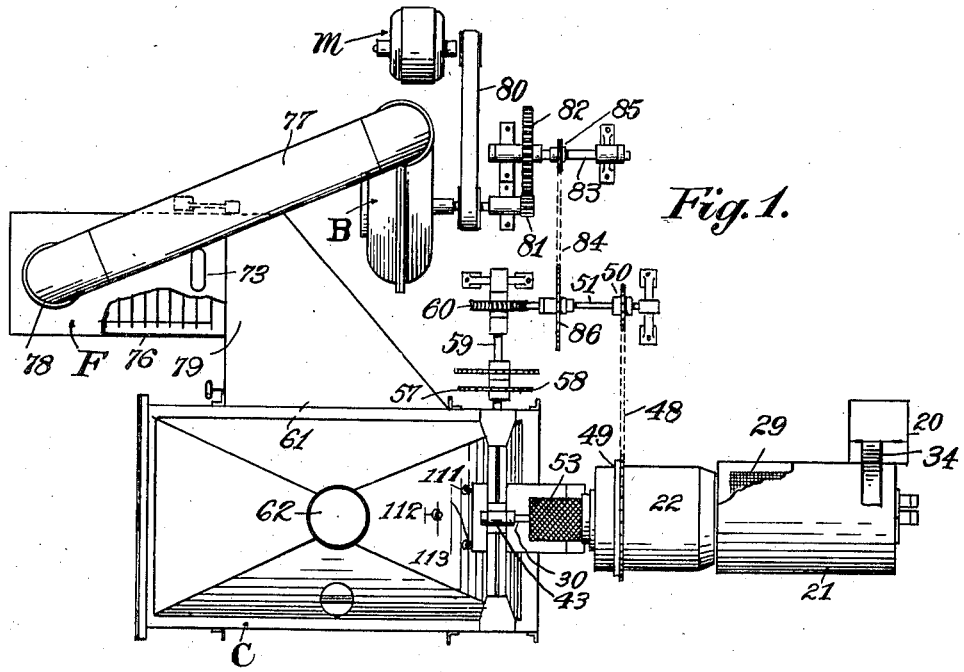

In the embodiment of the invention illustrated to carry out the invention the material is supplied to a receptacle 20, and in the case of fruit, vegetables and the like they are first pared and cleaned and cut into pieces, preferably of cubiform, the receptacle containing liquid, as water, in which the fruit or vegetables are immersed to be out of contact with the air. The material is constantly delivered from the receptacle 20 to a steaming chamber 21 having a steam inlet 21a and an outlet 21b for the waters of condensation of the steam which may lead back to the source of steam supply. The material is progressively fed through the chamber 21 and delivered to a water carrying drum 22, and from the water drum delivered to a hot air chamber C for drying.

The material is delivered from the receptacle 20 by suitable conveyor means, and shown as comprising buckets 23 pivotally carried by a chain or chains 24 passing around and having movement imparted thereto by a wheel 25, the buckets being adapted to dump the material therefrom as they pass over the wheel 25 into a chute 27 in the steam chamber 21 leading into a foraminous drum 29 mounted upon and rotatable with a shaft 30 in the steam chamber. The buckets 23 are arranged with perforations 23a to permit a portion of the water to drain therefrom as they are elevated but to retain a portion of the water therein to operate to wash the material from the buckets as they are dumped. The foraminous drum 29 (Figures 4, 10 and 11) comprises a pair of rims 31 carried by arms radiating from hubs mounted on the shaft 30 and around which rims perforated material, shown as wire cloth or mesh, is stretched with the end portions bent to form the ends of the drum, as at 32 and 33, with openings coaxially with the drum, and through the opening 33'' of which the chute 27 projects. The conveyor is enclosed by a housing 34 (Figures 2 and 9), the upper end of which is connected to the steam chamber, and the lower portion of which is constructed to constitute an outlet chute for the receptacle 20, as shown at 35, a circular drum 26 being arranged in said chute portion to serve as a guide for the conveyor chain or chains and buckets. The space between the drum 26 and the bottom of the chute 35 is so arranged as to leave sufficient room for the ready passage of the buckets, and the buckets in their passage therethrough pick up any material which has gravitated to said space from the receptacle 20. A valved outlet 35' may be provided in the lower portion of the housing to drain the water from the housing and the receptacle 20.

The conveyor for conveying the material from the receptacle 20 to the steaming chamber is driven from the shaft 30 by a chain 36 passing around a sprocket wheel 37 fixed to the shaft 30 and a sprocket wheel 38 fixed to a shaft 39 journaled in a bearing in a bracket 40 and bearing 41 mounted in the end of the steam chamber. The shaft 30 is also journaled at one end in the end wall of the steam chamber, as at 42, both of the bearings 41 and 42 being cap bearings to enclose the ends of the shafts 30 and 39 to prevent the escape of steam from the steam chamber through said bearings. The opposite end of the shaft 30 is journaled in a bearing 43 mounted on the drying chamber C. To permit of access to mechanism within the steam chamber said chamber is constructed in the form of axially separable sections, the upper section being hingedly connected at one longitudinal end to the lower section and being arranged with means to firmly secure the two together in closed position in steam tight connection.

The material is progressively fed through the drum 29 from the entrance end to the discharge end by blades 44 and delivered by the blades to pockets or buckets 45 at the end 32 and delivered from said pockets to a hopper portion extending into the drum of a chute 46 projecting through the end wall of the steam chamber. The material while in the drum and in its passage therethrough is in contact with steam in the steam chamber and the revolving of the drum and the conveying of the material thereto by the conveyor from the receptacle 20 and through the drum is such as to subject the material to the steam a sufficient length of time to partially cook the same.

The material is delivered from the drum 29 to the water carrying chamber or drum 22, which is also mounted upon the shaft 30 to rotate therewith, and the drum 29, said water drum being juxtaposed to the discharge end of the drum 29 and the steam chamber and having a charging opening into which the chute 46 extends. The outlet of the chute is in a portion which extends to the lower portion of the drum 22 to be sealed by the water in the drum. By this arrangement of the outlet chute 46 in the water in the drum 22 and the water in the lower part of the conveyor housing from the receptacle 20, the steam chamber is entirely sealed. The material is progressively and continuously fed through the drum 22 during the revolving thereof from the chute 46 and its discharge from an opening in the opposite end of the drum by blades 47 fixed in the drum and which may be similar to the blades 44 in the foraminous drum 29 in the steam chamber. The drum 22 may have a valved outlet 52 to drain the water therefrom. The shaft 30 with the drums 29 and 22 is driven from a suitable source, and is shown as being driven by a chain 48 passing around an annular sprocket wheel 49 encircling the drum 22 and around a sprocket wheel 50 (Figure 1) on a shaft 51.

After the material has been chilled by submersion in the water in the drum 22 it is delivered to the chamber C to be dried. However, before delivering the material to the drying and to drain the surplus water from the material it is delivered to a foraminous cylinder or drum 53, consisting of wire cloth or mesh extending around the discharge opening of the drum 22 and extending coaxially from the end of the drum as clearly shown in Figures 1, 2 and 4. A pan 54 having an outlet 55 extends below the cylinder 53 to catch the water as it drains from said cylinder. From the cylinder 53 the material is delivered to the drying chamber C through a chute 55$^a$ in an upwardly extended portion of the said chamber and delivered through the chute by a fan wheel 56 rotatable in a circular portion of the chute and driven by a chain 57 from a sprocket wheel 58 on a shaft 59. This fan wheel 56 comprises blades or panels extending radially and in opposite directions from a shaft and arranged so that the lateral edges engage the walls of the circular portion of the chute and operate to at all times maintain the opening through the chute closed to prevent the exit of the hot air in the chamber C therethrough and transport material through the chute as the wheel is revolved. The shaft 59 is driven from the shaft 51 by a worm 51$^a$ on said latter shaft meshing with a worm wheel 60 on the shaft 59.

The drying chamber C is of rectangular shape as shown in plan in Figure 1, and comprises framework with sheet metal secured thereto. The chamber has an inlet 61 in one side at the bottom for the entrance of dried and heated air, and an outlet 62 at the top for the air after it has been passed through the chamber and absorbed the moisture of the material being dried. The walls of the chamber are provided with hinged closures 63 for openings to swing on horizontal axes, and openings in one side wall of the chamber are closed by removable covers 64 having hand grips to remove and replace them in the openings. The hinged closures for the openings in the end walls and the openings closed by the covers 64 are arranged in line with a conveyor or conveyors in the chamber to be hereinafter described to inspect the condition of the material being dried during the different stages of the drying process.

Figure 2:
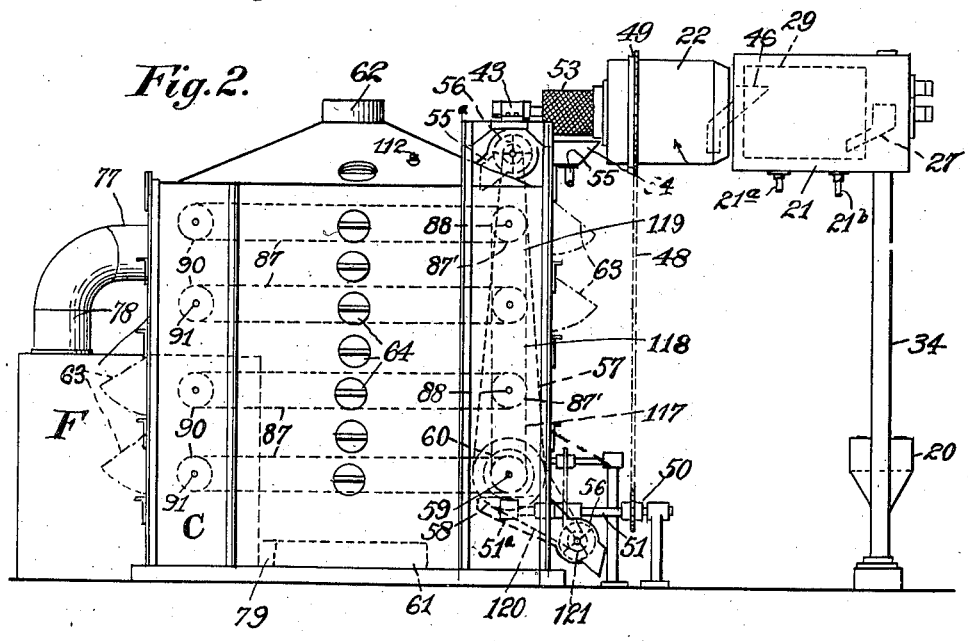
Figure 2 is a front elevation looking at the bottom of Figure 1.

The hot and dried air supply to the drying chamber is from a furnace, designated in a general way by F in Figures 1 and 2. This furnace is a combined steam generator for the steam for the steam chamber and air heating furnace. The furnace comprises plates 65, 66, 67, 68 and 69 bolted together to constitute the opposite side walls, the end wall, the top and the bottom, respectively, of a rectangular combustion chamber, and shown as provided with a grate 70. The side and end walls as well as the top are provided with laterally projecting ribs or fins, as shown at 71, for a purpose to be hereinafter described. The front wall 72 has the usual doors for the openings to the fire box and ash pit. The top plate has an opening 73 leading from the combustion chamber and adapted to be connected to a flue for the escape of the gases and products of combustion. For the purpose of generating steam a series or coils of pipes 74 extend along the sides of the combustion chamber, and may also extend along the top and rear wall, said pipes having an inlet 75 connected to a source of water supply and an outlet 76' adapted to be connected to the steam inlet 21ª of the steam chamber.

The side and end walls and the top of the combustion chamber are enclosed by a jacket 76 of sheet metal to constitute an air chamber around the combustion chamber, the walls of the jacket being spaced from the lateral edges of the ribs 71 to radiate the heat from said ribs and heat the air within the jacket instead of permitting the same to be transmitted to the walls of the jacket as would be the case should the ribs be in contact with such walls and radiating the heat through such walls to the air outside of the jacket.

To supply air to and create an air circulation through the jacket 76 and thereby through the drying chamber C a blower (shown in a general way at B) is employed, connected to a pipe 77 leading to the top and forward end of the jacket 76, as shown at 78, whereby the cool air is injected into the jacket at a point of the jacket where the heat is the greatest, and is then forced down around the sides and back of the combustion chamber to thoroughly heat the air, and is forced from the jacket through an outlet 79 at the bottom and rear of the jacket connected by a pipe or conduit having a flaring outlet to the inlet 61 of the chamber C. A suitable damper may be located in the connection between the outlet of the air jacket of the furnace and the inlet to the chamber C to shut off and control the flow of air from the jacket to said chamber, and this damper may be arranged with means controlled by the temperature of the air in the jacket to control and regulate the damper.

The blower B is preferably of the rotary type driven from a suitable source of power and shown as driven directly from an electric motor M by a belt 80 passing around pulleys on the motor shaft and the shaft of the blower. The motor M may also serve as the driving means for the drums 22 and 29 and the other movable parts of the apparatus through a pinion 81 meshing with a gear 82 on a shaft 83 which is in the nature of a speed reducing gearing. The shaft 51 is driven from the shaft 83 by a sprocket chain 84 passing around a sprocket wheel 85 on the shaft 83 and a sprocket wheel 86 on the shaft 51.

To dry the material it is transported to and fro longitudinally through the drying chamber C by conveyor means comprising a series of superposed endless conveyors, the material being delivered from the chute 55ª to the upper stretch of the uppermost conveyor, and the respective conveyors being constructed and arranged to deliver the material from the upper stretch to the lower stretch of a conveyor, and from an upper conveyor to the next adjacent lower conveyor. As the respective conveyors are similar consideration and description of one will suffice for all. Each of the conveyors comprises a pair of parallel chains 87 passing around sprocket wheels 87' fixed to a shaft 88 journaled in bearings mounted upon brackets 89 at one end of the chamber C, and around sprocket wheels 90 fixed to a shaft 91 journaled in bearings supported upon brackets 92 at the opposite end of the chamber. A series of trays 93 (Figures 3, 5 and 6) are successively connected adjacent their forward ends to these chains 87. The trays comprise a rectangular piece of perforated material, such as wire cloth or mesh. A bar 94 is connected to each tray adjacent the forward end, preferably at the bottom, by cleats 95 to extend transversely of the trays with the opposite ends of the bars projecting from the sides of the trays. The ends of the bars engage in openings in ears 96 connected to links of the chains and held against endwise movement by cotter pins passing through the bars. Bars 97 of substantially the same or slightly less length than the width of the trays are secured to the rear portions of the trays. These trays are arranged in successive juxtaposed relation with a portion of the forward end of the succeeding trays overlapping the rear portion of the preceding trays as clearly shown in Figures 3, 4 and 5. The rear portions of the trays as they are moved by the upper stretch of the conveyor chains are supported upon parallel bars or rods 98, supported on cross bars 98', the rods 98 extending slightly within and above the chains with one end 99 curved to guide the trays as they move around the pulleys 87' and of less length than the upper stretch of the conveyor chains, as at 100, whereby as the trays approach the sprocket wheels 90 they will ride from the ends of the supporting rods and tip as shown at 101 to dump the material from the upper trays to the trays of a lower stretch of the conveyor chains. The cross bars 98' have cut outs for the passage of the chains. In the position of the trays shown at 101 the trays will engage with a cylindrical portion extending between the sprocket wheels 90 which will cause the trays to move to the position shown at 102 and swing around the pivotal connection 94 of the tray with the chains as said connection of a tray and chain move to a position below the axis of the shaft 91 to the position shown at 103 with the portion of the trays which are uppermost when moved by the upper stretch of the chains engaging with parallel rods 104 supported on cross bars 104' extending in a plane slightly below and within the lower stretch of the chains. These rods 104 extend from adjacent one end of the chamber C to substantially adjacent the wheels 87' and terminate at a point substantially as shown at 105, and as the rear ends of the trays approach the ends of the rods they will ride off from said rods and drop dumping the material onto the trays of the upper stretch of the succeeding lower conveyor, as shown at 106, when the trays are carried around the wheels 87' as shown at 107 and 108 to position to again receive material from the chute 55ª.

To thoroughly and efficiently dry the material it is essential that the hot and dry air contact with substantially the whole surface of the material, and for this purpose means are provided to spread the material upon the trays in a thin layer as the material is delivered to the trays from the chute 55ª, and from the upper to the lower trays of the conveyors and from one conveyor to another. As the material is delivered by the chute 55ª it is directed to a spreader or plow 110 (Figure 12). This spreader comprises a bar or plate bent to angular shape as shown with circular portions or eyes at the bend and the ends for the engagement of supporting rods 111 and 112, having threaded ends extending through openings in the top 113 of the chamber C, and having nuts engaging the threaded ends of the rods and whereby the spreader may be adjusted toward and away from the trays. The spreader is adjusted to be spaced from the trays a distance equivalent to the thickness of the layer desired, and which depends upon the thickness of the material being dried. To prevent spilling of the material from the lateral ends of the trays guides 114 are provided at opposite ends of the trays. These may be of suitable form and construction and are shown as being of channel shape in cross section with one leg or wall of the channel engaging over the trays and secured to and supported by the side walls of the chamber by rivets or bolts passing through the opposite wall of the channel, as seen in Figures 3 and 6ª.

Similar guides are provided for the trays while being moved by the lower stretch of the chains. To prevent piling of the material on the trays of a lower stretch of the conveyor, or as the material is dumped from the trays of one conveyor to another spreaders are provided. These spreaders are in the nature of bars extending transversely of the trays, as at 116, and adjustable toward and away from the trays.

In the construction shown there are four conveyors one superposed to the other, and the conveyors are driven from the shaft 59, said shaft extending into the chamber C and upon which the sprocket wheels for the lower conveyor are mounted. The next succeeding upper conveyor is driven from the shaft 59 by a sprocket chain 117 passing around a sprocket wheel on the shaft 59 and the shaft of the conveyor wheels 87' of said conveyor. The next succeeding upper conveyor is driven by a chain 118 passing around sprocket wheels of the shafts of the conveyor wheels 87' of the respective conveyors, and the uppermost conveyor is driven in a like manner by a chain 119. As the material is delivered from the trays from the lower stretch of the lowermost conveyor it is delivered to a chute 120 leading to the exterior of the drying chamber and discharged from the chute to a suitable receptacle or bin. A fan wheel 121 similar to the wheel 56 in the chute 55ª is also mounted in the chute 120, said wheel operating to deliver the material through the chute and shut off escape of heated and dried air through the chute during the delivery of the material. To strengthen and add rigidity to the trays they may be provided with a piece of angle iron 123 at the opposite sides to extend from the front to the rear of the trays as shown in Figure 6.

In Figure 14 I have shown a modification of the means for mounting the draining drum 53. As shown in Figure 4 this drum is connected to the drum 22 and rotatable with said drum and the drum 29. These drums are rotated at a relatively slow speed with the result that such drainage as does take place as the material is delivered to the draining drum 53 must be by gravity. To permit of the rapid rotation of the draining drum and the throwing of the surplus water from the material carried thereby through centrifugal action, the draining drum is rotatably mounted upon the shaft 30 independent of the drum 22 and is provided with means to rotate the same independently of the shaft 30. As shown the drum is mounted on a sleeve 204 rotatable on the shaft 30, and motion is imparted to the drum from the shaft 30 through a gear 200 fixed on said shaft meshing with a pinion 201 rotatably mounted on a stud shaft, and a gear rotatable with the gear 201 meshing with a pinion 203 fixed to the sleeve 204.

Having thus described my invention, I claim:

1. In apparatus for dehydrating vegetables and the like, the combination with means to steam and chill the vegetables, of a drying chamber, means to cause the circulation of heated air through said chamber; and means to transport the vegetables to and fro in said chamber, comprising a series of superposed trays carrying conveyors arranged to deliver the vegetables from the trays of the upper stretch of the conveyor to the trays of the lower stretch of said conveyor and from the trays of the lower stretch of an upper conveyor to the trays of the upper stretch of the next succeeding lower conveyor; and means to deliver the vegetables from the steaming and chilling means to the conveyor and spread the same in a uniform layer upon the conveyor.

2. In apparatus for dehydrating vegetables, a drying chamber; and means to transport the material to and fro in said chamber; comprising a series of superposed conveyors, said conveyors consisting of chains stretched around revoluble sprocket wheels to travel in a horizontal path, trays pivotally connected to and supported at their forward ends by the chains, and means to support the rear portion of the trays independent of chains in their travel along the upper and lower stretch of the chains between the sprocket wheels, and successive trays arranged with the ends in overlapped relation to form a continuous supporting surface, and said trays being arranged to permit of the delivery of the material from the trays of the upper stretch of the chains, to the trays of the lower stretch of the chains, and means for spreading the material in a uniform layer upon the trays and prevent spilling of the material from the lateral ends of the trays, for the purpose specified.

3. In apparatus for dehydrating material, a drying chamber having an inlet; means connected to the inlet to cause a circulation of heated air through said chamber; and superposed conveyors to transport the material to and fro in said chamber, comprising chains; spaced sprocket wheels around which the chains pass, a series of foraminous trays pivotally connected to and supported at their forward ends by the chains; and means extending between the sprocket wheels upon which the trays are supported in their travel between the sprocket wheels and the trays arranged so that the ends of successive trays will be in overlapped relation to form a continuous support during said travel of the trays; said support being arranged to permit the rear portion of the successive trays to drop and dump the material from the trays of the upper stretch of the conveyor to the trays of the lower stretch of the conveyor, and from the lower stretch of a conveyor to the trays of the next succeeding lower conveyor, and means for spreading the material in a uniform layer upon the trays, for the purpose specified.

4. In apparatus for dehydrating material, a drying chamber; and superposed conveyors to transport the material to and fro in said chamber, comprising chains, spaced sprocket wheels around which the chains pass, a series of foraminous trays pivotally connected to and supported at their forward end by the chains; rods extending between the sprocket wheels to support the trays in their travel between the sprocket wheels and said tray being arranged so that the end portions of successive trays which overlap during this travel of the trays, said rods being of a length and arranged to permit the rear portion of the trays to run off from the rods and dump the material from the trays of the upper stretch of the conveyor chains to the trays of the lower stretch of the conveyor chains, and from said latter trays to the trays of a succeeding lower conveyor; means to deliver material to and spread the same upon the trays of the upper stretch of the conveyor; and means to spread the material on the trays of the lower stretch of the conveyor.

5. In apparatus for dehydrating material, a drying chamber; and superposed conveyors to transport the material to and fro in said chamber, comprising chains, spaced sprocket wheels around which the chains pass, a series of foraminous trays pivotally connected to and supported at their forward ends by the chains; rods extending between the sprocket wheels to support the trays in their travel between the sprocket wheels, said trays being arranged so that the end portions of successive trays will overlap during the travel thereof to provide a continuous supporting surface, and said rods being of a length and arranged to permit the rear portion of the trays to run off from the rods and dump the material from the trays of the upper stretch of the conveyor chains to the trays of the lower stretch of the conveyor chains, and from said latter trays to the trays of a succeeding lower conveyor; means to deliver material to the trays of the upper stretch of the upper conveyor; and angular shape member spaced from and above the trays to spread the material as it is delivered to the trays into a uniform layer upon the trays; guides extending along the lateral edges of the trays to prevent spilling the material from the lateral ends of the trays; means to spread the material upon the trays of the lower stretch of the conveyor as it is delivered thereto and the trays of the upper stretch of a succeeding lower conveyor, and means to cause heated air to circulate through the chamber.

6. In apparatus for dehydrating vegetables, the combination with means to steam and chill the vegetables of a drying chamber; means to cause the circulation of heated air through such chamber; and means to transport the material to and fro in said chamber, comprising endless foraminous conveyors arranged to deliver the material from the upper stretch to the lower stretch of one conveyor, and from the lower stretch of one conveyor to the upper stretch of a succeeding lower conveyor; means to deliver the material from the steaming and chilling means to the upper stretch of the upper conveyor and spread it into a uniform layer, means to spread the material as it is delivered to the lower stretch of said conveyor and to a succeeding lower conveyor, for the purpose specified and means to co-operate with the conveyors to prevent spilling of material from the lateral ends of the conveyor.

7. In apparatus for dehydrating material, the combination of a drying chamber having an inlet at the bottom and an outlet at the top; means in said chamber to which the material to be dried is delivered to transport the material to and fro through said chamber; a furnace having an air jacket with an outlet in the lower portion connected to the lower portion of the drying chamber; and means to forcibly inject air into top of the air jacket of the furnace, for the purpose specified.

8. In apparatus for dehydrating material, a drying chamber; conveyors to transport material to and fro in superposed horizontal plates in said chamber, comprising chains, spaced sprocket wheels around which the chains pass, a series of foraminous trays pivotally connected to and supported at their forward ends by the chains; means extending between the sprocket wheels upon which the trays are supported in their travel between the sprocket wheels; said support being arranged to permit the rear portion of the trays to drop and dump the material from the trays of the upper stretch of the conveyor to the trays of the lower stretch of the conveyor, and from the lower stretch of the conveyor at a predetermined point in the travel of the trays; means to deliver the material to the trays of the upper stretch of the conveyor and spread the material into a uniform layer, observation openings in the wall of the chamber in line with the conveyors, and means to cause heated air to circulate through the chamber for the purpose specified.

9. In apparatus for dehydrating material, a drying chamber having an inlet and outlet, means to transport the material to and fro in said chamber comprising chains, wheels over which said chains pass and operable to drive the same, a series of trays pivotally connected and supported at their forward ends by the chains, means to support the trays at the rear of their pivotal support by the chains in their travel between the wheels and permit the rear portion of the trays to tip downward and discharge the material therefrom, observation openings in the wall of the chamber having removable closures, an air heating element connected to the inlet of the chamber, and means to forcibly supply air to said element and cause a circulation of air through the drying chamber for the purpose specified.

JOSEPH E. KENNEDY.